Feb. 21, 1933.  E. MILLEE  1,898,679
LOADING RAMP FOR VEHICLES
Filed April 2, 1932
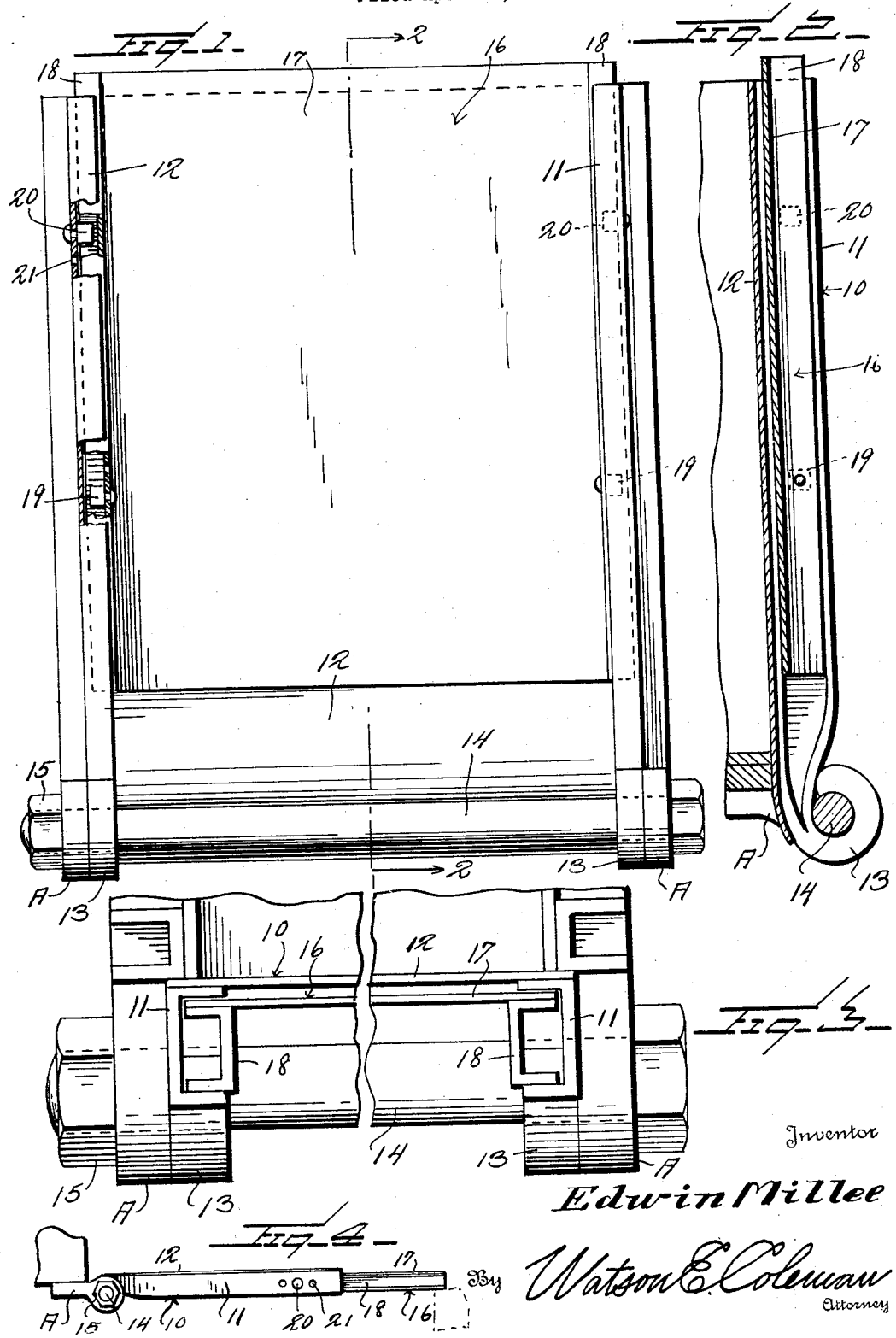
Inventor
Edwin Millee
By Watson E. Coleman
Attorney Patented Feb. 21, 1933

1,898,679

UNITED STATES PATENT OFFICE

EDWIN MILLEE, OF FORT SMITH, ARKANSAS

LOADING RAMP FOR VEHICLES

Application filed April 2, 1932. Serial No. 602,800.

This invention relates to devices for loading or unloading vehicles and particularly to a platform or ramp attached to the vehicle at the tail end thereof or opposite a door or the like, on a truck, wagon or freight car whereby goods may be unloaded from the vehicle on to the ground or loading platform or loaded into the truck.

One of the objects of the invention is to provide a device of this character which is hinged so that it may be lowered to any desired angle or may be raised to a vertical position to close the opening in the car or other vehicle.

A further object is to provide a construction of this character in which the ramp is adjustable as to length by forming it in two sections slidable with relation to each other, one of the sections being hingedly connected to the vehicle and the other section being slidable within the first named section and in this connection to provide adjustable means for limiting the outward movement of the two sections with reference to each other.

A further object is to provide a ramp of this character, the sections being provided on their lateral edges with reinforcing members or stiffening members, the stiffening members of the outer sections being formed as channels to receive the stiffening members of the inner section or slidable section.

Other objects will appear in the course of the following description.

My invention is illustrated in the accompanying drawing, wherein:—

Figure 1 is a rear elevation of a vehicle with the ramp in a vertical position;

Figure 2 is a section on the line 2—2 of Figure 1;

Figure 3 is a fragmentary top plan view showing the ramp in its vertical position;

Figure 4 is an elevation showing the ramp in a horizontal position.

Referring to this drawing, 10 designates the main section of the ramp which is constructed of two lateral channel sections 11 and a sheet metal section 12 riveted, welded or otherwise attached to the channel sections 11. One end of each of the channel sections is compressed as shown in Figure 2 and bent around to form a hook 13 through which passes a pintle bolt 14 carrying nuts 15 at its opposite ends. This bolt constitutes means whereby the outer section 10 may be pivotally connected to ears A extending from the wall of the vehicle as, for instance, from the rear of the vehicle or from the side wall of a railway car or the like.

This bolt constitutes a stiffening member holding the two channel irons 11 in proper spaced relation. Slidably disposed beneath the section 10 is the section 16 which is formed of a sheet of metal 17 reinforced and stiffened at its side edges by channel irons 18 which slide within the channel irons 12 as shown in Figure 3. The channel irons 18 carry upon them the opposed stops 19 projecting outward while the channel irons 12 carry upon them the inwardly extending stops 20. The channel irons 12 are perforated at 21 so that these stops 19 may be adjusted to any desired point and the vertical flanges of the channel irons 18 are also perforated so that the stops 20 may be adjusted to any desired point, thus controlling the outward movement of the inner section 16 with relation to the outer section.

In use, the adjustable section 16 is normally telescoped within the section 12 but when it is desired to load goods into the vehicle or unload the vehicle, the section 10 is lowered and at the same time the section 16 is allowed to slide out so that when both sections are lowered to the proper inclination, the lower edge of the section 16 will strike the ground or strike the loading platform and the live stock or goods may be transferred along this ramp to or from the vehicle. It will be seen that I have provided a loading platform or ramp which is part of the vehicle, which may be normally held in raised and contracted position, which, when raised, may constitute the door of the vehicle and which, when lowered, constitutes an extensible ramp along which goods may be transported. It will be particularly noted that the sheet metal bottom 12 of the outer section 10 extends over the bolt 14 so as to protect this bolt.

I claim:—

1. A ramp for vehicles, the ramp being formed of two sections, one of these sections having a sheet metal floor and laterally disposed channel iron reinforcing members, the channel irons at their rear ends being curved to form hooks, a bolt passing through said hooks and adapted to pass through ears on the vehicle, a second section having a sheet metal floor disposed beneath the floor of the first section and having laterally disposed channel irons having sliding engagement within the channel irons of the first-named section, a pair of inwardly projecting stops carried by the channel irons of the first-named section, and a pair of outwardly projecting stops carried by the channel irons of the second named section and coacting with the first named stops to limit the outward movement of the two sections.

2. A ramp for vehicles, the ramp being formed of two sections, one of these sections having a sheet metal floor and laterally disposed channel iron reinforcing members, the channel irons confronting one another and at their rear ends being formed to provide hooks, a bolt passing through said hooks and adapted to pass through ears on the vehicle, a second section having a sheet metal floor disposed immediately beneath the floor of the first-named section and having laterally disposed channel irons to which the floor is attached, the channel irons having their flanges extending away from each other and said channel irons being disposed within and having sliding engagement with the channel irons of the first named section.

3. A ramp for vehicles formed of two sections, one of the sections having a sheet metal floor and laterally disposed channel iron reinforcing members, the channel irons having flanges facing toward each other, the channel irons at their rear ends being curved to form hooks, and a second section having a sheet metal floor disposed beneath the floor of the first named section and having laterally disposed channel irons, the channel irons having their flanges facing away from each other, said last named channel irons being smaller in cross sectional area than the first named channel irons and having sliding engagement therein, a pair of inwardly projecting stops carried by the first named channel irons, a pair of outwardly projecting stops carried by the second named channel irons and coacting with the first named stops to limit the outward movement of the two sections.

In testimony whereof I hereunto affix my signature.

EDWIN MILLEE.